United States Patent [19]
Leiber et al.

[11] Patent Number: 5,104,714
[45] Date of Patent: Apr. 14, 1992

[54] ELASTIC PLASTIC NETTING MADE OF ORIENTED STRANDS

[75] Inventors: Yuval Leiber, D. A. Megido; Ya'Acov Agavof, Kibbutz Mishmar; Yonatan Arnon, Haemek, all of Israel

[73] Assignee: Tama Plastic Industry, Haemek, Israel

[21] Appl. No.: 444,057

[22] Filed: Nov. 30, 1989

[51] Int. Cl.$^5$ ............... B65D 71/00; B65B 13/02; B32B 5/12

[52] U.S. Cl. ............... 428/131; 428/107; 428/255; 428/910; 428/231; 428/523; 428/253; 206/597; 206/83.5; 206/442; 66/202

[58] Field of Search ............... 428/131, 107, 255, 910, 428/231, 523, 253; 206/597, 83.5, 442; 66/202

[56] References Cited

U.S. PATENT DOCUMENTS

| | | | |
|---|---|---|---|
| Re. 31,191 | 3/1983 | Connolly | 206/386 |
| 3,606,723 | 9/1971 | Clark | 53/21 FW |
| 3,697,347 | 10/1972 | Lehmann | 428/910 X |
| 3,753,845 | 8/1973 | Fairbanks | 161/92 |
| 4,135,501 | 1/1979 | Connolly | 53/461 |
| 4,201,814 | 5/1980 | Gilbert et al. | 428/910 X |
| 4,207,375 | 6/1980 | Kim et al. | 428/910 X |
| 4,208,457 | 6/1980 | Kelly | 428/107 |
| 4,332,326 | 6/1982 | Kelly | 206/497 |
| 4,366,665 | 1/1983 | Van Ginhoven et al. | 56/341 |
| 4,402,409 | 9/1983 | Slocumb | 206/597 |
| 4,458,467 | 7/1984 | Shulman et al. | 53/399 |
| 4,536,429 | 8/1985 | Mercer | 428/910 X |
| 4,569,439 | 2/1986 | Freye | 206/83.5 |
| 4,570,789 | 2/1986 | Fritz et al. | 206/83.5 |
| 4,741,442 | 5/1988 | Slocumb | 206/597 |
| 4,781,291 | 11/1988 | VanGinhoven | 206/83.5 |

FOREIGN PATENT DOCUMENTS

| | | |
|---|---|---|
| 1063227 | 3/1967 | United Kingdom . |
| 1213442 | 11/1970 | United Kingdom . |
| 1305653 | 2/1973 | United Kingdom . |
| 1390446 | 4/1975 | United Kingdom . |
| 1525980 | 9/1978 | United Kingdom . |
| 2059906 | 4/1981 | United Kingdom . |

OTHER PUBLICATIONS

"Round Baler Review", Power Farming, Mar. 1986.
"Twenty Percent More Hay", Bef, Nov. 1987.
TAMA Net flier.
Solcoor, Incorporated-Technical Specifications.
Modern Plastics Encyclopedia 1988.

Primary Examiner—Ellis P. Robinson
Assistant Examiner—William P. Watkins, III
Attorney, Agent, or Firm—Morgan & Finnegan

[57] ABSTRACT

An elastic wrapper netting, and a method for making same, wherein linear low density polyethylene ribbons are knitted into a Raschel net. The ribbons of the knitted wrapper netting have an orientation of about 1:4.25 in the longitudinal direction.

7 Claims, 3 Drawing Sheets

ELASTIC PLASTIC NETTING MADE OF ORIENTED STRANDS

BACKGROUND OF THE INVENTION

1. Field of the Invention

This invention relates to plastic knitted netting and its use in wrapping loads on pallets and in wrapping agricultural loads such as cylindrical bales of hay. Further, this invention relates to a method of making thermoplastic ribbons used to knit the netting so as to achieve the surprising result of excellent elasticity, elongation and residual elasticity.

2. Description of Related Art

Wrapping pallet loads and agricultural loads with plastic film and with plastic netting to hold and stabilize the loads has become a widespread practice. The plastic netting which has heretofore been used has been either extruded netting or knitted netting, such as Raschel netting. Some manufacturers of extruded netting have discovered that it is desirable to manufacture a netting having a high degree of stretch before tensile failure and having a high degree of elasticity. In the past, users of netting who have wanted high strength in their netting have had to use extruded netting. Extruded netting has had greater strength than knitted netting due to the much greater amount of material (i.e., greater cross-sectional area) contained in each strand of netting. With the recent awareness that extruded netting could also be made elastic as well as strong, there has been more interest in the use of extruded netting than in the past.

Knitted plastic netting is made of very thin ribbons of thermoplastic material in order to allow it to be knitted; and because of the thinness of the ribbons, knitted netting has not been considered as useful as extruded netting for heavy loads where tensile strength is important. Because of this perception, manufacturers of knitted netting have always attempted to make their netting as strong as possible while still using thin ribbons of thermoplastic in order to keep cost and weight as low as possible.

Whether one is using extruded netting or knitted netting, it is desirable to have a netting which is both strong and elastic. Strength is obviously an important physical characteristic in order to avoid having the netting break and causing the load to spill. Elasticity in a netting is a desirable characteristic because it provides continued tension to the load after wrapping and after the load may have experienced settling and a reduction in volume. A load wrapped by a netting having insufficient elasticity will become loose and unstable. Even with loads which will not settle or reduce in volume, it is undesirable to use a non-elastic netting because tightening the netting sufficiently to hold the load can sometimes damage the contents. Whereas, use of an elastic netting can provide sufficient load-holding tension without damage to the contents.

Although extruded netting is advantageous to use in some applications, it has many undesirable characteristics when compared to knitted netting. One, much less extruded netting can be wound on the same diameter spool compared to a spool of knitted netting. This disadvantage is important when one realizes how frequently rolls have to be changed on a pallet wrapping machine or how much storage space is needed to store the necessary inventory of netting. The same amount of knitted netting of this invention takes one-third the space of some conventional extruded netting.

Also, extruded netting creates great disposal problems. Because of the integral joining of the strands in extruded netting, the structure is very inflexible and is very difficult, if not impossible, to compact into a small space; and when it is done, the netting tends to spring open. The knitted netting of this invention is very easy to dispose of and can be easily gathered into a small volume for disposal.

It would be very desirable to combine the benefits of extruded netting and knitted netting in one netting product; however, in the past there has never been a way to combine the features of strength, stretchability and elasticity in one netting. This has been because the techniques used to strengthen a thermoplastic ribbon were the very techniques used to make a ribbon inelastic, and the techniques used to make a thermoplastic ribbon elastic resulted in a weaker ribbon.

SUMMARY OF THE INVENTION

This invention is directed to knitted plastic netting possessing an elongation (i.e., stretching) of more than about 60% before breaking, an elastic limit of more than about 6%, and will retain at least about 15% of its original length when stretched more than 40%. Further, in use, the netting of this invention is preferably stretched about 30–50% when wrapped around its load. This invention is particularly directed to a method of creating such a netting.

It has been discovered that the desired properties of the knitted netting of this invention is achieved by producing a substantially unoriented primary film consisting essentially of a thermoplastic, such as a polyolefin, slitting the primary film into ribbons, then orienting the ribbons by an amount to maximize the tensile energy at break or to at least about 80% of such maximum value, and then knitting such ribbons into a netting having longitudinal and lateral ribbons. It has been found that practicing this invention can optimize the relationship between the strength, elasticity, and stretchability. In particular, the preferred knitted netting of this invention will have an elongation at break of more than about 60%, an elastic limit of more than about 6%, and elasticity of more than about 15% when elongated more than 40%.

DETAILED DESCRIPTION OF THE INVENTION AND BEST MODE

Figure 1:
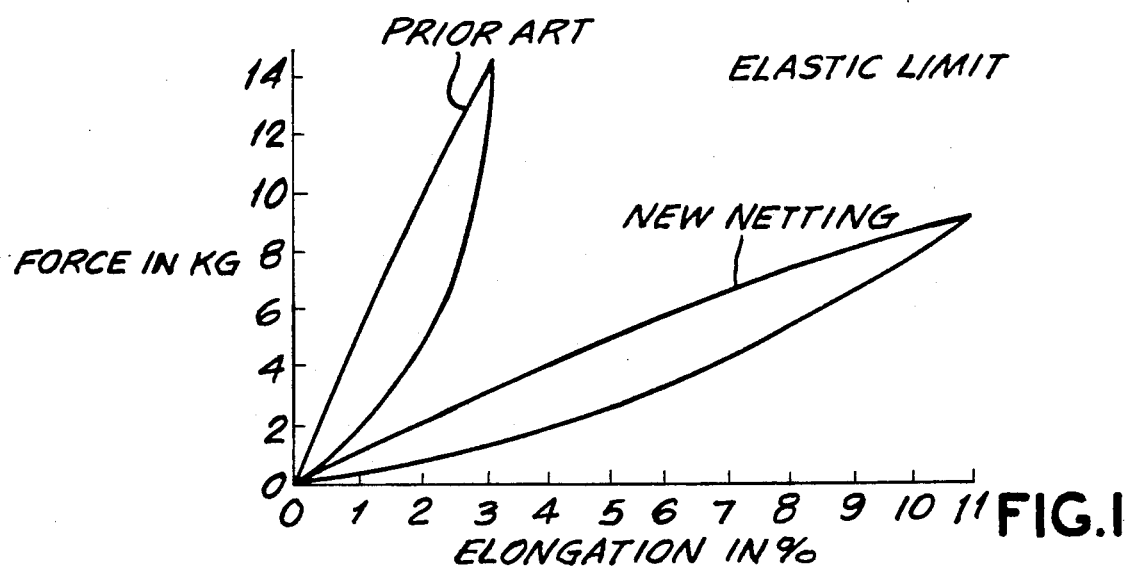
FIG. 1 is a force-elongation graph comparing the elastic limit of a prior art knitted netting not made by the method of this invention with a knitted netting made by the preferred embodiment of this invention.

In the preferred mode of this invention, the primary thermoplastic film is made by a conventional blown-film technique utilizing small thermoplastic pellets. Although, other methods of making the primary film can be used, such as the chill roll slot cast extrusion method or the water-quenched slot cast extrusion method, the blown film method is preferred. The netting may be formed of any thermoplastic material which can be formed into knittable ribbons. The thermoplastic material may be single polyolefin or a blend of polyolefins. The presently preferred material is linear low density polyethylene (LLDPE) which has been copolymerized with the alpha olefin, octene, and having a specific weight of about 0.92 g/cc.

It is well-known that when making primary film, increased orientation is achieved by pulling the end of the film out faster than it enters, wherein the ratio of the output velocity to the input velocity is the orientation value. It has been discovered that the desirable netting of this invention is obtained by using primary film that is substantially unoriented in any direction. Particularly, the film should have an orientation in the lateral direction of about 1.0, and an orientation in the longitudinal direction of between about 1.0-1.2. The preferable method of producing a primary film which is substantially unoriented in both directions is by producing the film with a blow-up ratio of 1:1 to 1:1.2. It is preferred that the thickness of the primary film which is used to make the longitudinal ribbons to be knitted into the netting be between about 0.08 mm to 0.10 mm, and preferably about 0.09 mm; and that the primary film which is to be used to make the lateral ribbons have a thickness of between about 0.04 mm and 0.06 mm, and preferably about 0.05 mm.

After the primary film is made, it is then passed to a machine for slitting the film into ribbons. The ribbons which are to be used as the longitudinal ribbons in the knitted netting, as well as the ribbons which are to be used as the lateral ribbons in the knitted netting are preferably slit into the same width of between about 2.4 mm and 2.6 mm and preferably about 2.5 mm. After the slitting process, the ribbons are then stretched and oriented in the longitudinal direction to a value of between about 1:4 and 1:5, and preferably about 1:4.25. This orientation produces a longitudinal ribbon having a thickness of between about 0.04 mm and 0.05 mm, and preferably about 0.044 mm, and a lateral ribbon having a thickness of between about 0.02 mm and 0.03 mm, and preferably about 0.024 mm. After orientation, both the longitudinal and the lateral ribbons have a width of between 1.2 mm and 1.3 mm, and preferably about 1.23 mm. The denier of the preferred longitudinal ribbons is between about 430 and 460, and preferably about 448, and the denier of the preferred lateral ribbons is between 240 and 250, and preferably about 244. The denier of a ribbon is a unit of weight and is defined as the weight in grams of 9000 meters of the ribbon. The next step in the process is to oil the ribbons and to knit them using a Raschel machine into a knitted netting.

It has been determined that by using a primary film which was substantially unoriented during its manufacture and by properly orienting the ribbons after cutting the film into ribbons, the desired characteristics for elongation at break, elastic limit, and elasticity can be achieved. The desired properties are achieved by having a high "tensile energy to break" value, preferably more than 80% of the maximum possible value, and more preferrably maximizing the "tensile energy to break" (TEB). The TEB is defined in ASTM D 882-83 as the area under the stress-strain curve to the break point. However, because netting having an elongation at break value of more than 130% are generally of no commercial value, it is preferred to measure and maximize the TEB up to 130% elongation. If netting having a greater elongation at break is commercially useful, for example, 150 or more, then the TEB should be measured and maximized up to this greater value.

Although it has been determined that in the preferred embodiment using the preferred thermoplastic material, the preferred ribbon orientation is about 1:4.25, when other materials are used, the proper ribbon orientation will need to be determined by preparing stress-strain curves for the netting made from the material at various ribbon orientations and then determining which orientation maximizes the TEB value. This ribbon orientation will provide a knitted netting having the most desired balance of strength (i.e., stress at break), elongation at break, elastic limit, stretchability (i.e., strain at break), and elasticity. Although it is preferrable to select this proper orientation for both the longitudinal and lateral ribbons, the invention could be practiced by orienting only the longitudinal ribbons pursuant to this invention and orienting the lateral ribbons by any of the prior art methods not in accordance with this invention. This new netting has been compared to a prior art netting which is made from high density polyethylene. This comparison is best seen in Table 1 on the following page and in FIGS. 1-3.

TABLE 1

|  | LONGITUDINAL RIBBONS OF PRIOR ART NETTING | LONGITUDINAL RIBBONS OF NEW NETTING |
| --- | --- | --- |
| Ratio Of Tape Orientation | 1:7.2 | 1:4.25 |
| Width Of Tape Prior To Orientation | 5.08 M.M. | 2.5 M.M. |
| Width Of Tape After Orientation | 1.89 M.M. | 1.23 M.M. |
| Thickness Of Tape Prior To Orientation | 0.080 M.M. | 0.09 M.M. |
| Thickness Of Tape After Orientation | 0.030 M.M. | 0.044 M.M. |
| Denier Of Tape After Orientation | 483 DEN. | 448 DEN. |
|  | LATERAL RIBBONS OF PRIOR ART NETTING | LATERAL RIBBONS OF NEW NETTING |
| Ratio Of Tape Orientation | 1:6.8 | 1:4.25 |
| Width Of Tape Prior To Orientation | 2.54 M.M. | 2.5 M.M. |
| Width Of Tape After Orientation | 0.97 M.M. | 1.23 M.M. |
| Thickness Of Tape Prior To Orientation | 0.07 M.M. | 0.05 M.M. |
| Thickness Of Tape After Orientation | 0.027 M.M. | 0.024 M.M. |
| Denier Of Tape After Orientation | 223 DEN. | 244 DEN. |
| MATERIAL | HDPE | LLDPE |

TABLE 1-continued

| | | |
|---|---|---|
| Specific Weight | 0.947 GR/CC | 0.92 GR/CC |
| Weight Per Square Meter Of Netting | 10 GR/M$^2$ | 10 GR/M$^2$ |
| Recommended Elongation Under Normal Palletizing Condition | 3-4% | 30-50% |
| Elastic Limit | 3% | 10% |
| Elasticity | 4% | 30% |

FIG. 1 represents the relationship between the elongation of the respective netting and the applied load. The upper portion of the curves represents elongation as the load is increased, and the bottom portion represents the elongation as the load is released. It is seen that the new netting material is more elastic than the old netting, both in the sense of being more easily elongated and in having a higher elastic limit. The elastic limit is defined as that percentage of elongation experienced by the ribbon after which the ribbon can return to its original length. If the ribbon is stretched beyond the elastic limit, the ribbon undergoes irreversible deformation, meaning that when the load is released, the ribbon does not return to its original length.

Figure 3:
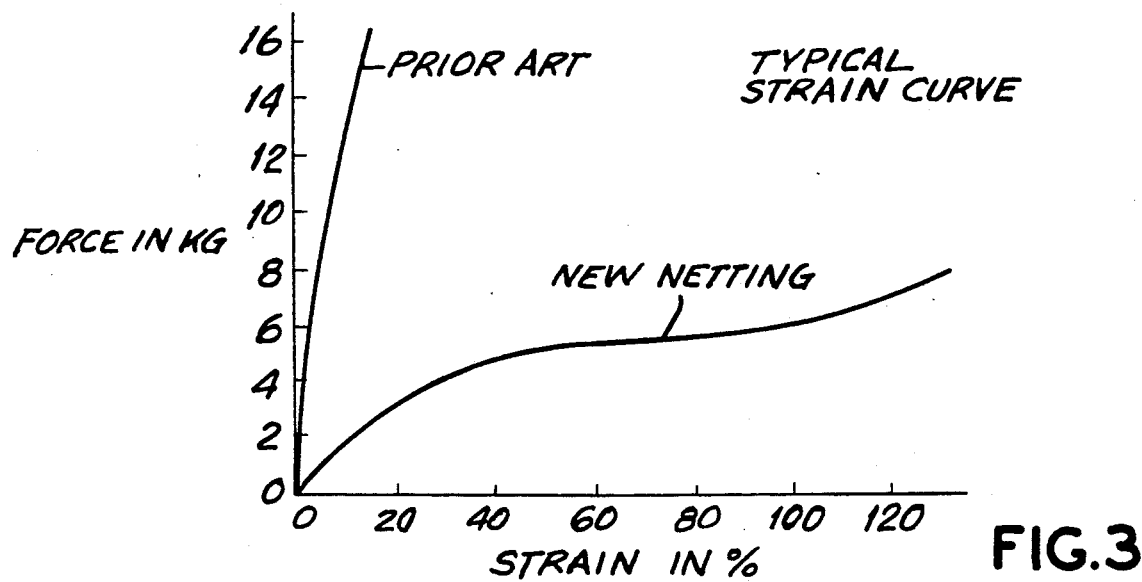
FIG. 3 is a graph which compares the force-elongation characteristics of a prior art knitted netting with a knitted netting made according to this invention.

Referring now to FIG. 3, this graph bears the important force-elongation curves for the new netting and the prior art netting. It is seen that the prior art netting is not nearly as stretchable as the new netting. It is seen that the new netting can undergo elongation of 130% of its original length, whereas the prior art netting can only undergo elongation of about 15%. It can be visualized by looking at the two curves in FIG. 3 that the tensile energy at break (TEB) for the new netting is much greater than that for the prior art netting. Calculating the TEB for each netting results in the new netting having a TEB value of about 58.75 Mjoules/m$^3$ (mega joules per cubic meter), while the TEB value of the prior art netting is about 26.11 Mjoules/m$^3$.

Figure 2:
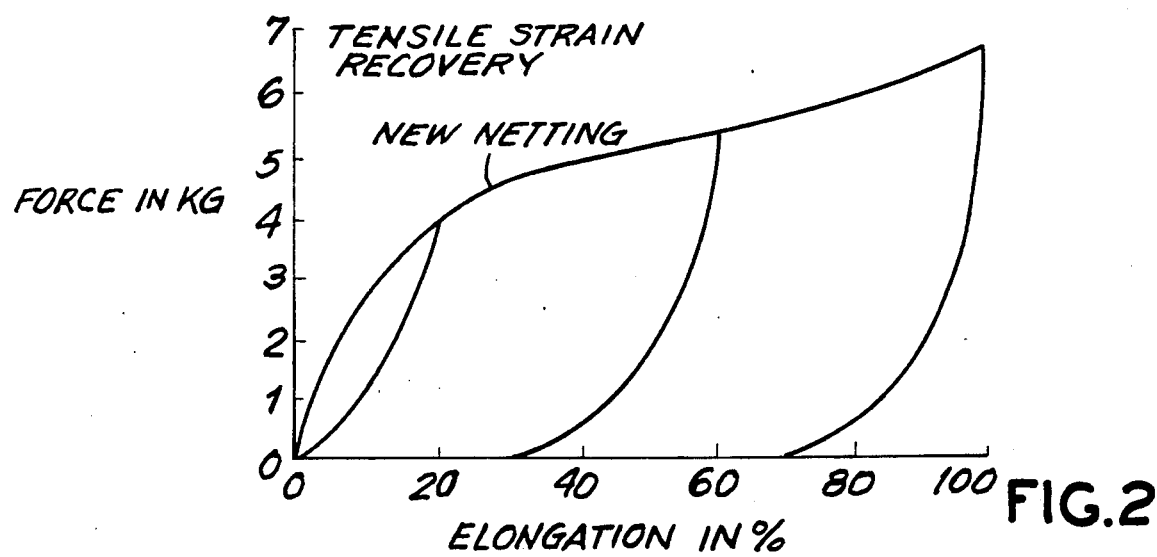
FIG. 2 is a force-elongation graph showing the tensile strain recovery for a knitted netting made by the preferred embodiment of this invention after various amounts of elongation.

Another benefit of the new netting can be seen by viewing FIG. 2, which shows the hysteresis of the new netting after undergoing elongation of 20%, 60%, and 100%. It is seen that after 20% elongation, the netting nearly returns to its original length, whereas, after elongations of 60% and 100%, the netting returns to 30% elongation and 70% elongation, respectively based on its original length. This characteristic of the new netting provides residual stress and continued tension on a load regardless of how much the netting is stretched during the wrapping process.

Figure 4A:
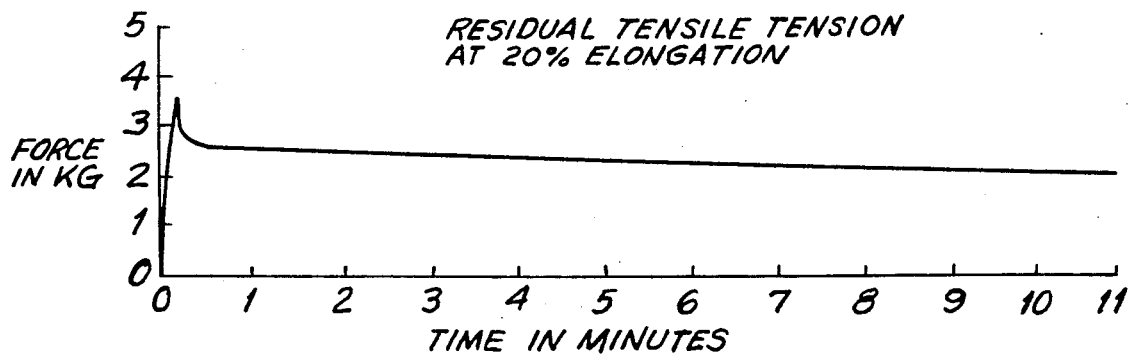
FIG. 4 contains two graphs which illustrates the residual tensile tension characteristics of the preferred knitted netting of this invention after different amounts of elongation up to 11 minutes.
Figure 4B:
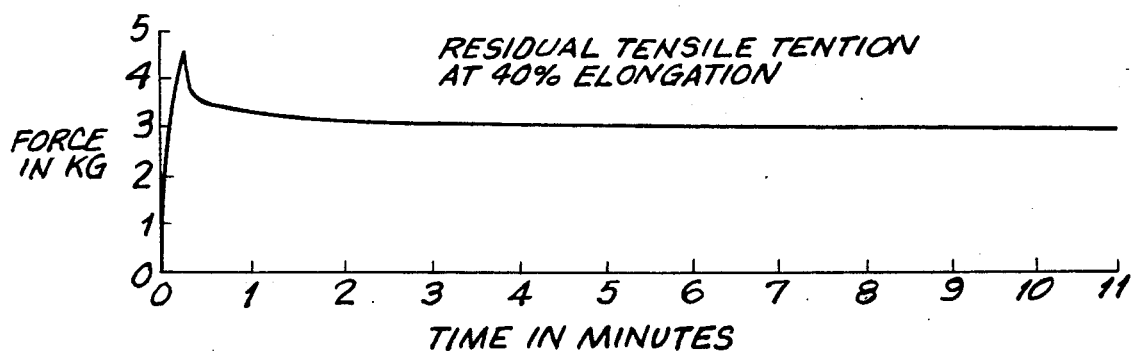
Figure 5:
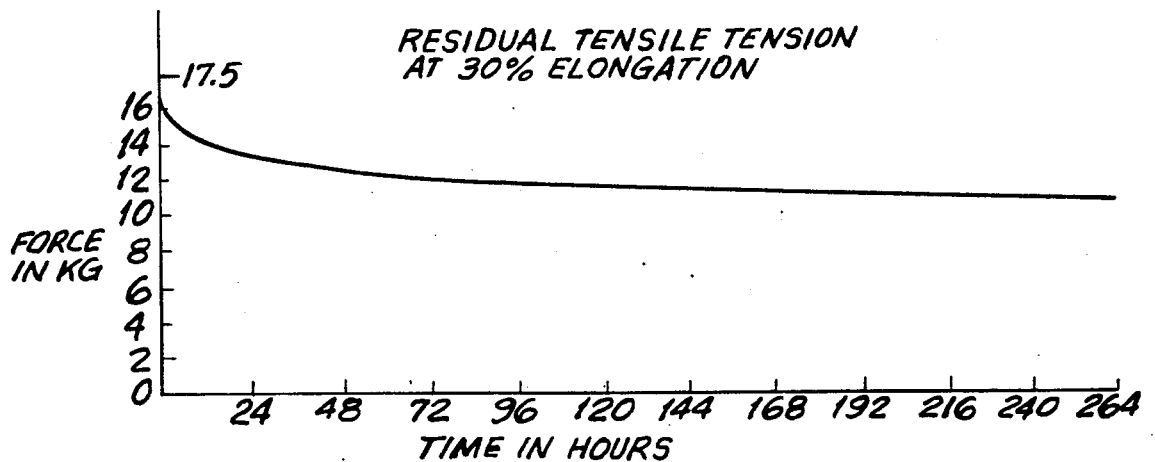
FIG. 5 contains a graph which shows the residual tensile tension characteristics of the preferred knitted netting of this invention up to 264 hours.

Turning now to FIG. 4, the residual tensile tension for the new netting after elongations of 20% and 40% is plotted versus time, and it is apparent that the new netting maintains its tension for a long time, as shown in FIG. 5.

EXAMPLE

Thermoplastic pellets consisting essentially of linear low density polyethylene (LLDPE) are extruded by the blow-film method into one primary film having a thickness of about 0.9 mm. This film will be used to make the longitudinal ribbons. The same thermoplastic is extruded into a film having a thickness of about 0.05 mm to be used to make the lateral ribbons. The LLDPE is made by Dow Chemical Company and is sold under the name DOWLEX 2045 E (General Purposes). The film is produced under conditions such that it undergoes no orientation in either the longitudinal or lateral direction.

Once the primary film is made, it is fed into an I.S.O. machine for slitting into ribbons and stretching in order to produce the properly oriented ribbons. The I.S.O. machine is manufactured by I.S.O., a company located at Rosenfeld, West Germany. The film for both the longitudinal ribbons and the lateral ribbons are fed into the I.S.O. machine at a temperature of 100°-110° degrees C. The longitudinal ribbons are first slit to a width of 2.5 mm and then oriented to a value of 1:4.25. The width and thickness of the longitudinal ribbons after orientation are 1.23 mm and 0.044 mm, respectively. The lateral ribbons are first slit to a width of 2.54 mm and then oriented to a value of 1:4.25. The width and thickness of the lateral ribbons after orientation are 1.23 mm and 0.024 mm, respectively.

The denier of the longitudinal ribbon prior to orientation is 1900, and after orientation of 1:4.25 is 448. The denier of the lateral ribbon prior to orientation is 1040 and after orientation of 1:4.25 is 244. The longitudinal ribbons and the lateral ribbons are then placed on their respective grooves for knitting on the Raschel knitting machines. The Raschel knitting machine then produces a knitted netting which is rolled up onto a spool for future use. The netting has a width of up to 500 cm and the weight of the netting is about 10 grams/square meter.

Figure 6:
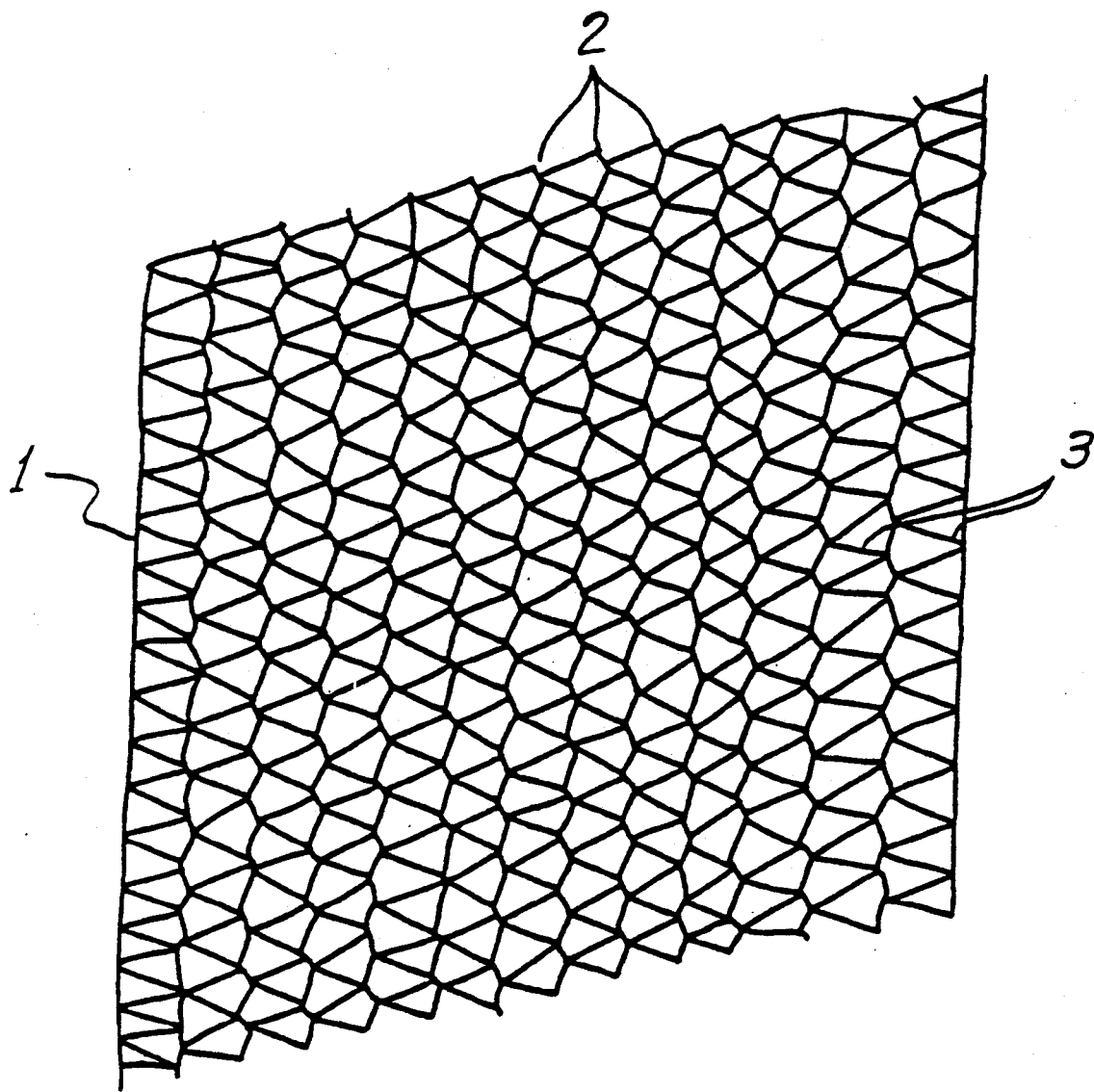
FIG. 6 shows a sample of the preferred netting of this invention.

The completed netting is shown in FIG. 6 wherein a section of netting 1 is comprised of longitudinal ribbons 2 and lateral ribbons 3.

This netting stretches 130% when stretched at the rate of 100% per minute before breaking, has an elastic limit of 10, and has a tensile strain recovery of 30% after elongation of between 40% to 130%. A 50 cm width of this netting will break at 40 Kg.

This knitted netting is utilized with a conventional pallet wrapping machine and the load is wrapped by stretching the netting around the load so that it elongates 20%-40% and is wrapped in a spinal or parallel fashion by a wrapping machine intended for this purpose or by hand. Because of the characteristics of this netting, round bales of hay can be wrapped by only one and one-third circumferences around the load.

Although the invention has been described in its preferred embodiment, it will be apparent to those skilled in the art that the procedures and techniques of this invention can be applied to other materials to achieve the desired results of this invention. Accordingly, the scope of this invention is defined by the scope of the following claims.

What is claimed is:

1. A knitted thermoplastic netting comprising longitudinal ribbons and lateral ribbons wherein:
   the ribbons consist essentially of linear low density polyethylene, said ribbons being oriented and having a ratio of stretched oriented length to original substantially unoriented length of between 1:4 to 1:5; and
   the longitudinal ribbons have an elastic limit of more than about 6%, an elongation at break of more than about 60%, and a elasticity of more than about 15% when stretched more than 40%.

2. The netting of claim 1 wherein the ribbons are oriented after being slit from the film by an amount which will produce a tensile energy at break (TEB) of about 80% of the maximum TEB possible, for said ribbons measured up to an elongation of 130%.

3. A knitted netting comprising longitudinal and lateral ribbons, said ribbons having been cut from a substantially unoriented primary film consisting essentially of linear low density polyethylene, wherein said ribbons, are oriented and have a ratio of stretched oriented length to original substantially unoriented length of between 1:4 to 1:5, said longitudinal ribbons having a width of between about 1.2 mm and 1.3 mm, and a thickness of between about 0.04 mm and 0.05 mm.

said lateral ribbons have a width of between about 1.2 mm and 1.3 mm and a thickness of between about 0.02 mm and 0.03 mm;

the longitudinal ribbons have a denier of between about 430 and 460, and the lateral ribbons have a denier of between about 240 and 250; and the netting having an elastic limit of at least about 6%, an elongation to break of at least 60%, and a elasticity of at least about 15% when stretched more than 40%.

4. A knitted thermoplastic netting according to claim 1, wherein said orientation is about 1:4.25.

5. A wrapped bale of agricultural crops, comprising:
a cylindrical body of agricultural crops; and
a knitted thermoplastic netting comprising longitudinal and lateral ribbons, said ribbons consisting essentially of linear low density polyethylene, said ribbon being oriented and having a ratio of stretched oriented length to original substantially unoriented length of between 1:4 to 1:5; and said longitudinal ribbons having an elastic limit of more than about 6%, an elongation at break of more than about 60%, and an elasticity of more than about 15% when stretched more than 40%.

wherein said knitted netting extends about the circumference of said cylindrical body enclosing and maintaining the crops therein.

6. A wrapped bale of agricultural crops according to claim 5, wherein said orientation is about 1:4.25.

7. A wrapped bale of agricultural crops according to claim 5, wherein said agricultural crops are hay.

* * * * *